Elias Levee, Sulky Plow.

74554

PATENTED
FEB 18 1868

Witnesses

Inventor
Elias Levee
per [attorneys]

United States Patent Office.

ELIAS LEVEE, OF WEST POINT, IOWA.

Letters Patent No. 74,554, dated February 18, 1868.

IMPROVEMENT IN SULKY-PLOUGHS.

The Schedule referred to in these Letters Patent and making part of the same.

TO ALL WHOM IT MAY CONCERN:

Be it known that I, ELIAS LEVEE, of West Point, in the county of Lee, and State of Iowa, have invented a new and improved Sulky-Plough; and I do hereby declare that the following is a full, clear, and exact description thereof, which will enable those skilled in the art to make and use the same, reference being had to the accompanying drawings, forming part of this specification.

Similar letters of reference indicate corresponding parts.

My invention has for its object to furnish an improved sulky-plough, so constructed and arranged that it may be easily raised from and lowered into the ground, which will not be raised out of the ground by the wheels passing over obstructions or rough places, and which shall be simple in construction, and easily adjusted to run at any required depth; and it consists in the construction and combination of the various parts, as hereinafter more fully described.

Figure 1:
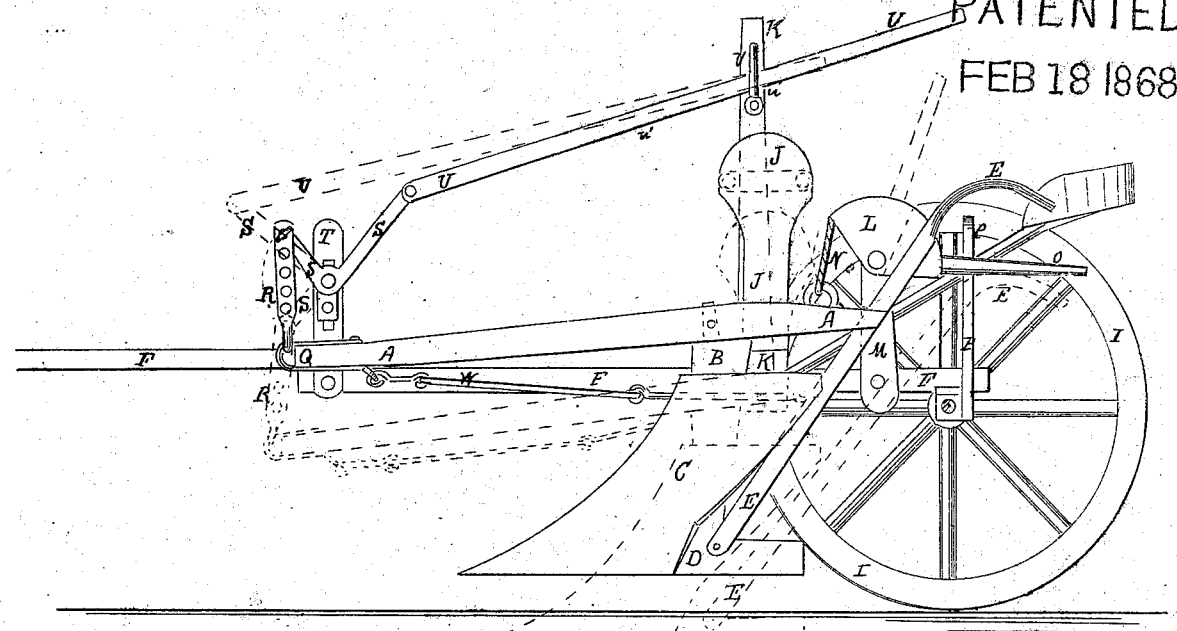
Figure 1 is a side view of my improved plough, one of the wheels being removed.
Figure 2:
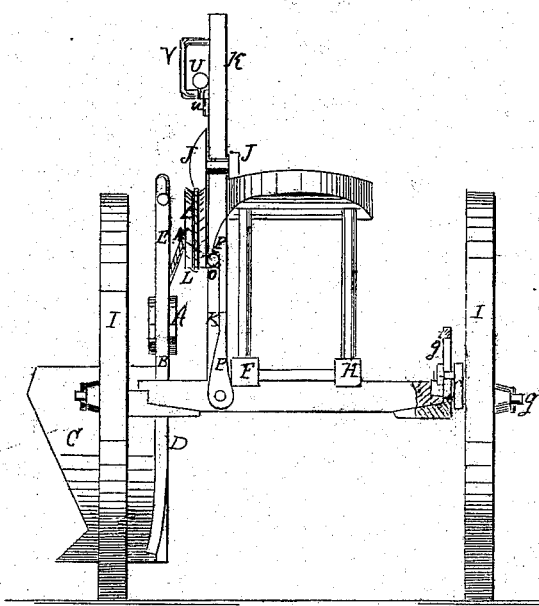
Figure 2 is a rear view of the same.

A is the beam, B is the standard, C is the mould-board, D is the land-side, and E is the handle of a single-handled plough, or of a plough with one of its handles removed, and about the construction of which parts there is nothing new. F is the tongue, the rear end of which is secured to the axle G, and which is strengthened by the brace H. The journal $g^1$ of that one of the wheels I which runs upon the land-side of the plough is made crank-shaped, as shown in fig. 2, and is secured in a slotted support, $g^2$, so that it may be so adjusted that the machine may run level, when one wheel runs in the furrow and the other upon the unploughed ground. J is a guard attached to the middle part of the plough-beam A, and which slides up and down upon a standard or guide-bar, K, attached to the side of the tongue F.

This construction compels the plough to move vertically when raised and lowered, and also enables the sulky to rise in passing over obstructions or rough parts of the ground without raising the plough.

L is a segment of a grooved wheel or pulley, which is pivoted to the upper end of the standard M, the lower end of which is attached to the side of the tongue F. N is a chain, the lower end of which is attached to the beam A, and its upper end to the segment L, so that, by turning said segment about its pivoting point, the plough may be raised and lowered, as desired. O is a lever or handle, attached to the segment L, for convenience in operating it. P is a spring-catch attached to the axle G or tongue F, in such a position as to take hold of the lever or handle O, when lowered to raise the plough out of the ground, so as to hold the said plough suspended while passing from place to place.

The draught is attached to the forward end of the beam A by a clevis, Q, in the ordinary manner. R is a bar, the lower end of which is pivoted to the clevis Q, and which is attached to the end of the forward arm of the bent lever S, by a bolt or pin passing through the end of the said arm, and through one or the other of the holes formed through the said bar R, so that the forward end of the plough-beam A may be adjusted to run at a higher or lower level, as may be desired. The bent lever S is adjustably pivoted at its angle to a support, T, attached to the side of the tongue F. To the end of the upper arm of the bent lever S is pivoted the forward end of the bar U, which passes back through a keeper, V, attached to the upper part of the upright guide-bar K, and its rear end extends back into such a position that it may be easily reached and operated by the driver from his seat. By pushing the bar U forward, the forward end of the plough-beam A will be lowered, and, by drawing the said bar back, the forward end of the said plough-beam will be raised. $u'$ is a stop-pin or catch attached to the bar U, and which, when the said bar is drawn back to raise the forward end of the plough-beam to its greatest height, catches upon the keeper V, to steady and hold the plough-beam while passing from place to place.

W is a chain or jointed rod, the forward end of which is attached to the lower side of the forward part of the plough-beam A, and the rear end of which is attached to the lower side of the rear part of the tongue F, so that the sulky may be drawn by the draught applied to the forward end of the plough-beam A.

Having thus described my invention, I claim as new, and desire to secure by Letters Patent—

1. The combination of the sliding guard or guide-bars J and K with the plough-beam A, and with the tongue F or frame of the sulky, substantially as herein shown and described and for the purpose set forth.

2. The combination of the adjustable bar R, adjustable bent lever S, and bar or handle U, with each other, and with the plough-beam A and support T, attached to the tongue F or frame of the sulky, substantially as and for the purpose set forth.

3. The combination of the crank-journal $g^1$, slotted support $g^2$, wheel I, and axle, substantially as described and for the purpose specified.

The above specification of my invention signed by me, this 19th day of November, 1867.

ELIAS LEVEE.

Witnesses:
WM. R. STEWART,
ALEX. CRUIKSHANK.